D. G. Taylor,
Churn.
No. 97,565. Patented Dec. 7, 1869.
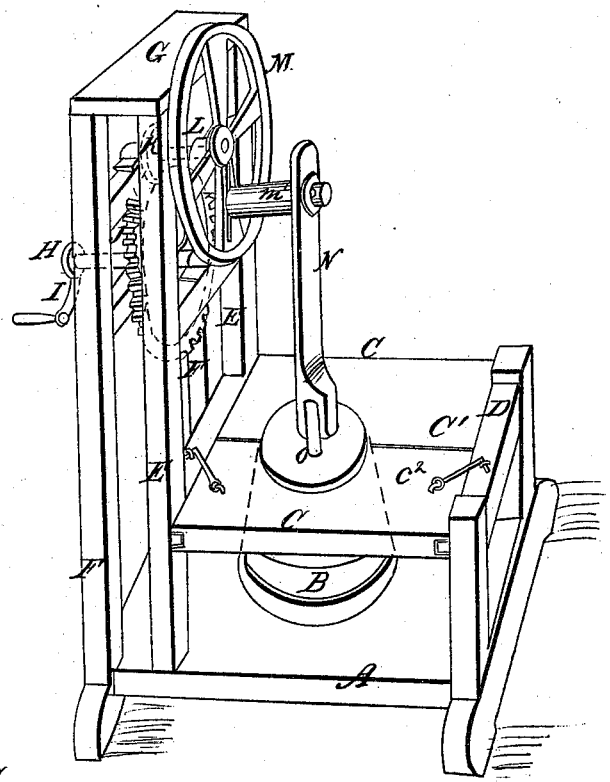

United States Patent Office.

D. G. TAYLOR, OF CAMPBELLSVILLE, KENTUCKY.

Letters Patent No. 97,565, dated December 7, 1869.

IMPROVEMENT IN CHURNING-MACHINES.

The Schedule referred to in these Letters Patent and making part of the same

*To all whom it may concern:*

Be it known that I, D. G. TAYLOR, of Campbellsville, in the county of Taylor, and State of Kentucky, have invented a new and improved Churning-Machine; and I do hereby declare that the following is a full, clear, and exact description thereof, which will enable others skilled in the art to make and use the same, reference being had to the accompanying drawing, forming part of this specification.

The figure is a perspective view of my improved machine.

My invention has for its object to furnish an improved means for holding the churn in position during the operation of churning; and It consists in the construction and combination of parts, as will be hereinafter described.

A represents the foundation-frame or platform that supports the churn B.

The upper part of the churn B is held in place while the churning is being done by the platform C, which is made in two parts, $c^1$ and $c^2$, which are notched upon their adjacent edges to fit upon the upper part of the churn B.

The part $c^1$ is stationary, one end being attached to the upper part of the frame D, the lower part of which is attached to one end of the foundation-frame or platform A, and its other end is attached to the frame E, the lower end of which is attached to the base-platform A, near its other end, and the upper end of which extends up to support the gearing, for giving motion to the churn-dasher.

The other part, $c^2$, is grooved upon its ends, to slide upon tongues formed upon or attached to the frames D and E, so that the said part may be conveniently removed to release the churn when desired. The part $c^2$, when in place, may be secured by hooks, as shown in the figure.

F is a frame, of the same size as the frame E, the lower end of which is attached to the end of the frame A, near the frame E.

The upper ends of the frames E and F are connected by a board or cap, G, as shown in the figure.

H is a shaft, which revolves in bearings in the lower cross-bars of the frames E and F, and to one end of which is attached the crank I, to which the power is applied.

To the shaft H, between the frames E and F, is attached a large gear-wheel, J, the teeth of which mesh into the teeth of the small gear-wheel K, attached to the shaft L, which revolves in bearings attached to the upper cross-bars of the frames E and F.

To the inner end of the shaft L is attached a crank-wheel, M, which is made large, to serve as a fly-wheel.

The crank-pin $m'$ of the wheel M should be secured in a radial slot in the wheel M, so that it may be adjusted to increase or diminish the length of stroke of the dasher.

To the end of the crank-pin $m'$ is pivoted the upper end of the connecting-rod N, the lower end of which is pivoted to the upper end of the dasher-handle O.

Having thus described my invention,

What I claim as new, and desire to secure by Letters Patent, is—

The combination of the churn with the platform C, made in two parts, the one, $c^1$, stationary, the other, $c^2$, movable, and secured by hooks to the frame D, all constructed and arranged as herein shown and described, for the purpose set forth.

D. G. TAYLOR.

Witnesses:
D. G. MITCHELL,
JOHN H. CHANDLER.